United States Patent [19]

Scriver et al.

[11] Patent Number: 5,219,944
[45] Date of Patent: Jun. 15, 1993

[54] TIRE TREAD RUBBER

[75] Inventors: Richard M. Scriver; Tomasz S. Mroczkowski, both of Madison; Shailesh D. Patkar, New Haven, all of Conn.

[73] Assignee: Pirelli Armstrong Tire Corporation, New Haven, Conn.

[21] Appl. No.: 728,895

[22] Filed: Jul. 10, 1991

[51] Int. Cl.$^5$ .................... C08L 9/02; C08L 47/00
[52] U.S. Cl. .................... 525/233; 152/209 R; 524/515; 524/518; 525/210; 525/237
[58] Field of Search .................... 525/237, 233, 210

[56] References Cited

U.S. PATENT DOCUMENTS

| | | |
|---|---|---|
| 3,978,165 | 8/1976 | Stumpe, Jr. et al. |
| 4,192,366 | 3/1980 | Scriver et al. |
| 4,530,959 | 7/1985 | Armbruster et al. ............. 525/237 |
| 4,843,120 | 6/1989 | Halasa et al. ............. 525/237 |
| 4,946,887 | 8/1990 | Takino et al. |

FOREIGN PATENT DOCUMENTS 2129249 5/1990 Japan.

OTHER PUBLICATIONS

Bhakuni, et al., Encyclopedia of Polymer Science and Engineering, 2nd ed., vol. 16, John Wiley, 1989, pp. 838, 842.

Eirich, F., Science and Technology of Rubber, Academic Press, New York, 1978, pp. 374, 375.

Rubber Technology Handbook, Hofmann, W., Oxford Press, 1989, p. 128.

*Primary Examiner*—Jacob Ziegler
*Attorney, Agent, or Firm*—St. Onge Steward Johnston & Reens

[57] ABSTRACT

An all season tire tread rubber blend comprises about 30 to 50 parts per hundred low vinyl polybutadiene; about 25 to 60 parts per hundred natural rubber and/or synthetic polyisoprene; and about 10 to 25 parts per hundred high styrene styrene/butadiene rubber and/or other diene polymer having a glass transition temperature of about $-5°$ to about $-20°$ C. A preferred embodiment comprises about 40 parts per hundred low vinyl solution polybutadiene, about 40 parts per hundred natural rubber, and about 20 parts per hundred high styrene solution styrene/butadiene. Tires employing the tire tread rubber of this invention exhibit improved wet and winter traction and superior abrasion resistance and treadwear without increased rolling resistance.

20 Claims, 3 Drawing Sheets

TIRE TREAD RUBBER

BACKGROUND OF THE INVENTION

This invention relates to a new all season tire tread rubber comprising low vinyl polybutadiene, polyisoprene, and a diene polymer having a glass transition temperature of about −5° to about −20° C.

Tire tread compositions are engineered to produce traction, speed, stability, and casing protection, simultaneously providing frictional contact for the transmission of driving, braking and cornering forces as well as wear resistance. Typical tread rubber compositions employ elastomers having a relatively high tensile strength and high abrasion resistance. However, compounding elastomers for improved traction may adversely affect abrasion resistance and tire rolling resistance; conversely, tire traction can suffer when trying to improve rolling resistance. To balance these counteracting considerations, blends of styrene/butadiene and butadiene rubber are commonly employed in passenger tires (Bhakuni, et al., *Encyclopedia of Polymer Science and Engineering*, 2nd ed., volume 16, John Wiley, 1989, page 838); other elastomers such as natural rubber may be used to modulate cure, dynamic, or physical properties, or the flex fatigue life of the tire. Fillers, notably carbon black, are added to reinforce the elastomers and improve strength (Eirich, F., *Science and Technology of Rubber*, Academic Press, New York, 1978, pages 374 and 375 and Bhakuni, et al., cited above, page 842).

For example, Studebaker and Beatty described three tread compositions: two had styrene/butadiene elastomers and one had natural rubber (Eirich, F.R., *Science and Technology of Rubber*, Academic Press, 1978, pages 374 to 375; compounds 188, 208 and 211 are treads). Bridgestone disclosed a tire rubber composition comprising 50 to 85 parts by weight of natural rubber or synthetic polyisoprene, 5 to 20 parts by weight of high styrene styrene/butadiene, and 5 to 45 parts by weight of low styrene styrene/butadiene (Jap. Pat. Ap. Pub. No. 2,129,240). Takino, et al., disclosed a tire tread rubber composition having a two-peak loss tangent curve and comprising isoprene containing more than 50% total 3,4- and 1,2-vinyl bonds and styrene/butadiene in a ratio of 5/95 to 60/40, with 50 to 200 parts by weight carbon black (U.S. Pat. No. 4,946,887).

SUMMARY OF THE INVENTION

It is an object of this invention to provide a new tire tread rubber. It is another object of this invention to provide tires having treads that exhibit good traction properties in all conditions (dry, wet, snow, and ice), good handling characteristics, and decreased rolling resistance without abnormal tire treadwear.

These and other objects are accomplished by the present invention, which describes rubber blends comprising low vinyl polybutadiene, polyisoprene, and a diene polymer having a glass transition temperature of about −5° to about −20° C., in amounts effective to produce a blend suitable for use in automobile and light truck tire treads and tire retreads. Preferred rubber blends comprise about 30 to 50 parts per hundred low vinyl polybutadiene; about 25 to 60 parts per hundred natural rubber and/or synthetic polyisoprene; and about 10 to 25 parts per hundred high styrene styrene/butadiene rubber and/or other diene polymer having a glass transition temperature of about −5° to about −20° C. A preferred embodiment comprises about 40 parts per hundred low vinyl solution polybutadiene, about 40 parts per hundred natural rubber and about 20 parts per hundred high styrene solution styrene/butadiene. A method for producing tire tread rubber compositions according to this invention is also disclosed.

DETAILED DESCRIPTION OF THE INVENTION

Figure 1:
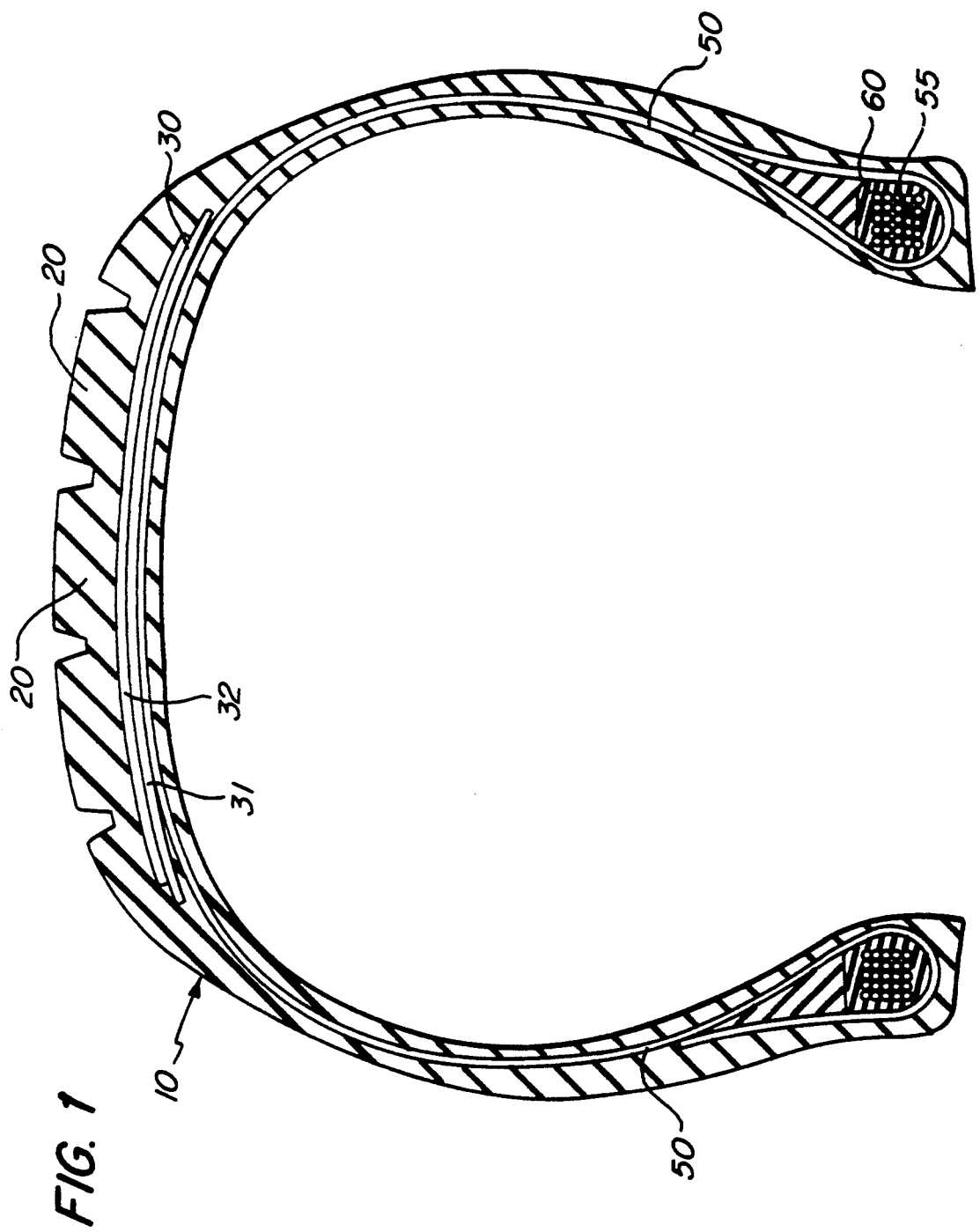
FIG. 1 is a schematic cross section of a tire employing the tire tread rubber composition of this invention in tread component 20.

In the practice of this invention, rubber blends comprising low vinyl polybutadiene, polyisoprene, and a diene polymer having a glass transition temperature of about −5° to about −20° C. are employed in all season tire tread rubber compositions for passenger cars and light trucks, tire retreads and the like. Preferred rubber blends comprise about 30 to 50 parts per hundred low vinyl polybutadiene; about 25 to 60 parts per hundred natural rubber and/or synthetic polyisoprene; and about 10 to 25 parts per hundred high styrene styrene/butadiene and/or other diene polymer having a glass transition temperature of about −5° to about −20° C. Tires having the tread rubber blend of the invention exhibit a superior dynamic response in wet and winter driving conditions, good handling characteristics, and improved abrasion resistance without increased rolling resistance.

Low vinyl polybutadiene is employed in the rubber blends of this invention. By the term "polybutadiene" is meant polymerized butadiene or butadiene rubber, herein abbreviated BR. The vinyl content of polybutadiene refers to the weight percent of monomer in the 1,2-configuration. By the term "low vinyl" is meant having a vinyl content of about 10 to about 30 weight percent. The vinyl groups, or 1,2-monomers, can occur anywhere in the butadiene polymers: in clusters or groups, or interspersed regularly or irregularly among 1,4-monomers.

Polybutadiene prepared by any known means including free radical, emulsion, ionic, coordination, bulk, solution, or suspension polymerization of butadiene may be employed. However, low vinyl solution polybutadiene prepared in a solution polymerization process employing an organic solvent and using lithium or the like catalyst is preferred, or its chemical equivalent.

Polyisoprene is also employed in the rubber blends of this invention. The polyisoprene may be natural or synthetic, or a mixture of the two. By the term "natural polyisoprene" is meant natural rubber obtained from natural sources, or its chemical equivalent, such as cis-1,4-polyisoprene. By the term "synthetic polyisoprene" is meant any polyisoprene produced synthetically, regardless of the isomeric configuration of the isoprene monomers. Blends of synthetic polyisoprenes with natural rubber can be used in the rubber blends of this invention. Natural rubber is employed in preferred embodiments.

A diene polymer having a glass transition temperature of about −5° to about −20° C. is also employed in the rubber blends of this invention. Diene polymers having glass transition temperatures in this range include high styrene styrene/butadiene (hereinafter referred to as SBR) co-polymers, polymethylbutadiene polymers (methyl rubber), butadiene/acrylonitrile copolymers, styrene/isoprene/butadiene terpolymers, ethylene/propylene/diene, high 3,4-polyisoprene, and the like elastomers, including thermoplastic elastomers having a diene component. Mixtures of rubbers may also be employed.

High styrene solution SBR is employed in preferred embodiments. By "high styrene" is meant about 30 to about 50 weight percent bound styrene. By "solution" is meant prepared by the polymerization of styrene and butadiene in a solution, or a process yielding a chemical equivalent thereof, rather than in a free radical, emulsion, ionic, coordination, bulk, or suspension polymerization process.

In one embodiment of the invention, the tire tread rubber blend comprises about 30 to 50 parts per hundred low vinyl solution polybutadiene, about 25 to 60 parts per hundred natural rubber, and about 10 to 25 parts per hundred high styrene solution styrene/butadiene. A preferred rubber blend comprises about 40 parts low vinyl solution polybutadiene, about 40 parts natural rubber and about 20 parts high styrene solution styrene/butadiene.

Tire tread rubber blends of this invention are processed with effective amounts of processing aids, accelerators, cross-linking and curing materials, antidegradants, fillers and the like to make tire tread rubber compositions. Processing aids include, but are not limited to, processing oils, plasticizers, tackifiers, extenders, chemical conditioners, homogenizing agents and peptizers such as mercaptans, petroleum and vulcanized vegetable oils, resins, rosins, and the like. Accelerators include amines, guanidines, thioureas, thiazoles, thiurams, sulfenamides, thiocarbamates, xanthates, and the like. Cross-linking and curing agents include sulfur, zinc oxide, and fatty acids. Antidegradants include antioxidants and antiozonants. Fillers include carbon black and mineral fillers such as silica and clay. Example formulations are set forth hereinafter.

The materials are mixed in a single step or in stages. Two or three-stage processes are preferred. For example, the rubber blend can be processed with filler, wax, some antidegradants, and effective amounts of processing oils in one step, with accelerators, curing and cross-linking agents, and the remaining antidegradants added in a second stage. Additional stages may involve incremental additions of filler and processing oils.

The tire tread compositions of this invention are employed in tire treads. As is known to those skilled in the art, in the conventional manufacture of a radial ply tire, the extruded tread composition is wrapped over the belt area of a green tire in the final stages of tire assembly prior to curing. For further understanding of the position of these components, reference is made to accompanying FIG. 1, which depicts a cross-sectional view of tire 10 which employs the tire tread composition of this invention in tire tread component 20.

The tire of FIG. 1 consists of a carcass structure comprising one or more carcass plies 50, provided with textile cords disposed according to a radial extension, folded back from the inside to the outside around a metal bead core 55 disposed in the area of the tire bead, over which, at a radially external position, a filling strip 60 of elastomeric material of substantially triangular cross-sectional shape is placed in a manner known by those skilled in the art. Disposed crown-wise to the tire carcass, in the usual manner, is a tread component or band 20, and inserted between the carcass and the tread band is a belt structure 30 consisting of two radially superposed layers 31 and 32 of cords disposed at angles with respect to the midcircumferential plane of the tire in opposite directions, preferably symmetrically. The belt layers are formed in any appropriate known manner and in particular can comprise textile and/or metal reinforcing cords.

Tires so formed with the tire tread rubber blends of this invention have an array of desirable characteristics. In tire road tests comparing the performance of tires having the tread rubber of this invention with control tires, wet ice traction and dry ice traction was improved, and snow traction was significantly improved. The overall ride and handling was also improved. Abrasion resistance was good; preferred tire tread compositions exhibited superior treadwear and less abrasion when compared with controls. Goodyear-Healey rebound of preferred tread compositions embodiments show good resilience (e.g., ∼37% to ∼39% rebound at room temperature). The physical properties of example compositions are set out hereinafter, as are tire road test results.

Measures of dynamic response of preferred compositions predict good traction without increased rolling resistance, especially in wet and winter conditions. An industry accepted measure of tire traction, for example, is hysteresis loss, denoted by loss factor tan $\delta$, as determined by any number of dynamic viscoelasticity tests. Traction improvement is obtained through an increase of the loss factor in the mid-range temperature region (e.g., between about, −20° and 30° C.) without the rubber composition becoming too hard. On the other hand, increased hysteresis loss at higher, operating temperatures of the tire (e.g., about 30° C. and above) results in higher rolling resistance and lower fuel economy. At very low temperatures (e.g., below about −20° C.), flexible compositions are preferred over stiffer ones. To balance these counteracting considerations, the desirable tread compositions of this invention are flexible at very low temperatures and exhibit low hysteresis loss at higher temperatures, with hysteresis loss at intermediate temperatures (in the wet traction zone) superior to a control. Example hysteresis loss measurements, as well as dynamic modulus testing and loss modulus response, are plotted hereinafter.

Thus, employment of low vinyl polybutadiene with polyisoprene and high styrene styrene/butadiene as the rubber in tire treads provides improved all season tires having superior wet and winter traction, abrasion resistance and treadwear.

EXAMPLES

The following examples are presented to further illustrate and explain the present invention and should not be taken as limiting in any regard. Unless otherwise indicated, all parts and percentages are by weight, and are based on the weight at the particular stage of the processing being described.

EXAMPLE 1

This example illustrates the preparation of a tire tread rubber composition comprising the rubber blend of this invention (C, below) and two control compositions (A and B below).

TABLE I

| Material | Composition, parts | | |
|---|---|---|---|
| | A | B | C |
| Natural Rubber | 25 | 40 | 40 |
| Low Vinyl Polybutadiene (20% vinyl) | 0 | 0 | 40 |
| High Styrene Styrene/Butadiene (Tg, −10°) | 0 | 20 | 20 |
| Low Styrene Styrene/Butadiene[1] | 0 | 40 | 0 |
| Butadiene Rubber | 17 | 0 | 0 |
| Styrene/Butadiene (1712 Type) | 48 | 0 | 0 |
| Polynorbornene | 10 | 0 | 0 |
| Filler[2] | 69 | 80 | 80 |
| Processing Oil | 26 | 45 | 45 |
| Zinc Oxide | 1.7 | 2.0 | 2.0 |
| Fatty Acid | 1.7 | 2.0 | 2.0 |
| Sulfur | 1.3 | 1.5 | 1.5 |
| Other[3] | 6.43 | 7.4 | 7.4 |

[1] 18% styrene
[2] Carbon black and/or silica
[3] Accelerators, antidegradants, tackifiers, peptizers, resins, waxes and the like

EXAMPLE 2

In this example, the physical properties of the rubber compositions of Example 1 are compared and contrasted. The values are presented in Table II below.

TABLE II

| Physical Property | Composition | | |
|---|---|---|---|
| | A | B | C |
| Mooney Viscosity (ASTM D3646) | | | |
| ML 4' @ 100° C. | 60.9 | 59.8 | 66.0 |
| Mooney Scorch @ 135° C. (ASTM D1546) | | | |
| 2 pt. rise | 13.3 | 15.1 | 13.7 |
| 5 pt. rise | 14.4 | 16.3 | 15.5 |
| 10 pt. rise | 15.0 | 16.9 | 16.1 |
| Hardness IRHD (ASTM D1415) | | | |
| 25' @ 148° C. | 66.9 | 69.2 | 68.4 |
| 35' @ 148° C. | 67.7 | 68.9 | 67.6 |
| Specific gravity (ASTM D297) | 1.139 | 1.132 | 1.130 |
| Unaged Stress/Strain (ASTM D412) | | | |
| M 300% 25' @ 148° C., MPa | 9.537 | 8.196 | 7.468 |
| 35' @ 148° C., Mpa | 9.531 | 8.876 | 8.199 |
| Tensile 25', MPa | 17.584 | 17.306 | 16.731 |
| 35', MPa | 17.431 | 17.776 | 16.975 |
| Elong. @ Break, 25' | 517 | 553 | 592 |
| 35' | 514 | 551 | 552 |
| Rheometer (1d · 100 cpm · 148° C., ASTM D2084) | | | |
| $M_L$ | 3.58 | 2.80 | 3.55 |
| $M_{H2}$ | 18.42 | 16.48 | 19.10 |
| $t_R$ | 6.69 | 7.77 | 7.38 |
| $t_{50}$ | 8.73 | 9.42 | 9.07 |
| $t_{90}$ | 14.81 | 14.57 | 14.06 |
| BFG Flexometer (35' @ 148° C., ASTM D623) | | | |
| Final Temp, °F. | 187 | 186 | 180 |
| % Set | 11.65 | 13.22 | 11.94 |
| % Static Compression | 38.05 | 37.28 | 38.91 |
| % Dynamic Compression | 37.05 | 35.29 | 33.43 |
| % Final Dynamic Comp. | 40.30 | 41.15 | 40.70 |
| Goodyear-Healey Rebound (35' @ 148° C., ASTM D1054) | | | |
| % Rebound @ RT | 40.30 | 38.30 | 40.30 |
| % Rebound @ 100° C. | 59.00 | 56.40 | 58.40 |
| Penetration @ RT | 0.192 | 0.191 | 0.195 |
| Penetration @ 100° C. | 0.258 | 0.276 | 0.260 |

EXAMPLE 3

This example compares and contrasts tire tread compositions comprising a control rubber blend (composition D), rubber blends comprising low vinyl polybutadiene, polyisoprene and high styrene styrene/butadiene blended in particular proportions (compositions E, F, and G), and rubber blends comprising natural rubber and low vinyl polybutadiene (compositions H and I). Components of the compositions are set out in Table III and the physical properties of the compositions are given in Table IV.

TABLE III

| Material | Composition, parts | | | | | |
|---|---|---|---|---|---|---|
| | D | E | F | G | H | I |
| Low Styrene Styrene/Butadiene Rubber[1] | 40.0 | 0 | 0 | 0 | 0 | 0 |
| Natural Rubber | 40.0 | 40.0 | 25.0 | 60.0 | 25.0 | 75.0 |
| Low Vinyl Polybutadiene (20% vinyl) | 0 | 40.0 | 50.0 | 30.0 | 75.0 | 25.0 |
| High Styrene Solution Styrene/Butadiene[2] | 20.0 | 20.0 | 25.0 | 10.0 | 0 | 0 |
| Filler | 80.0 | 80.0 | 80.0 | 80.0 | 80.0 | 80.0 |
| Processing Oil | 45.0 | 45.0 | 45.0 | 45.0 | 45.0 | 45.0 |
| Antidegradants | 2.75 | 2.75 | 2.75 | 2.75 | 2.75 | 2.75 |
| Curing and Crosslinking Agents | 4.5 | 4.5 | 4.5 | 4.5 | 4.5 | 4.5 |
| Other[3] | 5.0 | 5.0 | 5.0 | 5.0 | 5.0 | 5.0 |

[1] 18% styrene
[2] Glass transition temperature = −10° C.
[3] Processing aids, fatty acids, waxes, and the like.

TABLE IV

| Physical Property | Composition | | | | | |
|---|---|---|---|---|---|---|
| | D | E | F | G | H | I |
| Mooney Viscosity (ASTM D1646) | | | | | | |
| ML 4' @ 100° C. | 67.3 | 69.3 | 69.1 | 66.7 | 76.3 | 67.4 |
| Specific Gravity (ASTM D297) | 1.131 | 1.126 | 1.126 | 1.120 | 1.117 | 1.120 |
| IRHD Durometer (ASTM D1415) | | | | | | |
| 30' @ 151° C. | 63.9 | 66.1 | 64.3 | 64.7 | 62.9 | 62.7 |
| Unaged Stress/Strain (ASTM D412) | | | | | | |
| 300% Modulus, 30' @ 151° C., Mpa | 5.991 | 6.354 | 5.738 | 6.666 | 5.478 | 6.257 |
| Tensile, 30', MPa | 16.128 | 16.389 | 15.223 | 16.555 | 15.174 | 16.193 |
| Elong. @ Break, 30' | 650 | 650 | 674 | 624 | 654 | 622 |
| Rheometer (1d · 100 cpm · 148°C., ASTM D2084) | | | | | | |
| $M_L$ | 8.50 | 9.20 | 8.80 | 8.80 | 10.10 | 8.80 |
| $M_{H2}$ | 24.90 | 26.90 | 26.80 | 26.60 | 28.80 | 28.80 |
| $t_S$ | 13.12 | 11.00 | 20.80 | 16.02 | 15.90 | 13.83 |
| $t_{50}$ | 16.53 | 14.73 | 29.90 | 19.55 | 20.60 | 18.92 |
| $t_{90}$ | 23.53 | 22.58 | 43.77 | 25.97 | 29.88 | 28.38 |
| BFG Flexometer (40' @ 151° C., ASTM D623) | | | | | | |
| Δ T | 188 | 191 | 191 | 184 | 220 | 178 |
| % Set | 11.36 | 12.21 | 12.69 | 1.09 | 8.03 | 9.57 |
| % Static Compression | 45.94 | 43.15 | 42.46 | 43.50 | 42.46 | 43.23 |
| % Initial Dynamic Compression | 35.77 | 33.99 | 35.01 | 35.57 | 35.01 | 35.14 |
| % Final Dynamic Compression | 39.22 | 40.68 | 41.86 | 41.42 | 42.95 | 40.76 |
| Goodyear-Healey Rebound (40' @ 151° C., ASTM D1054) | | | | | | |
| % Rebound @ RT | 37.0 | 37.0 | 34.9 | 40.3 | 44.2 | 43.7 |
| % Rebound @ 100° C. | 54.4 | 52.0 | 53.5 | 56.4 | 54.9 | 57.9 |
| Penetration @ RT | 0.218 | 0.212 | 0.217 | 0.226 | 0.218 | 0.240 |
| Penetration @ 100° C. | 0.285 | 0.274 | 0.281 | 0.291 | 0.267 | 0.296 |

EXAMPLE 4

Figure 2:
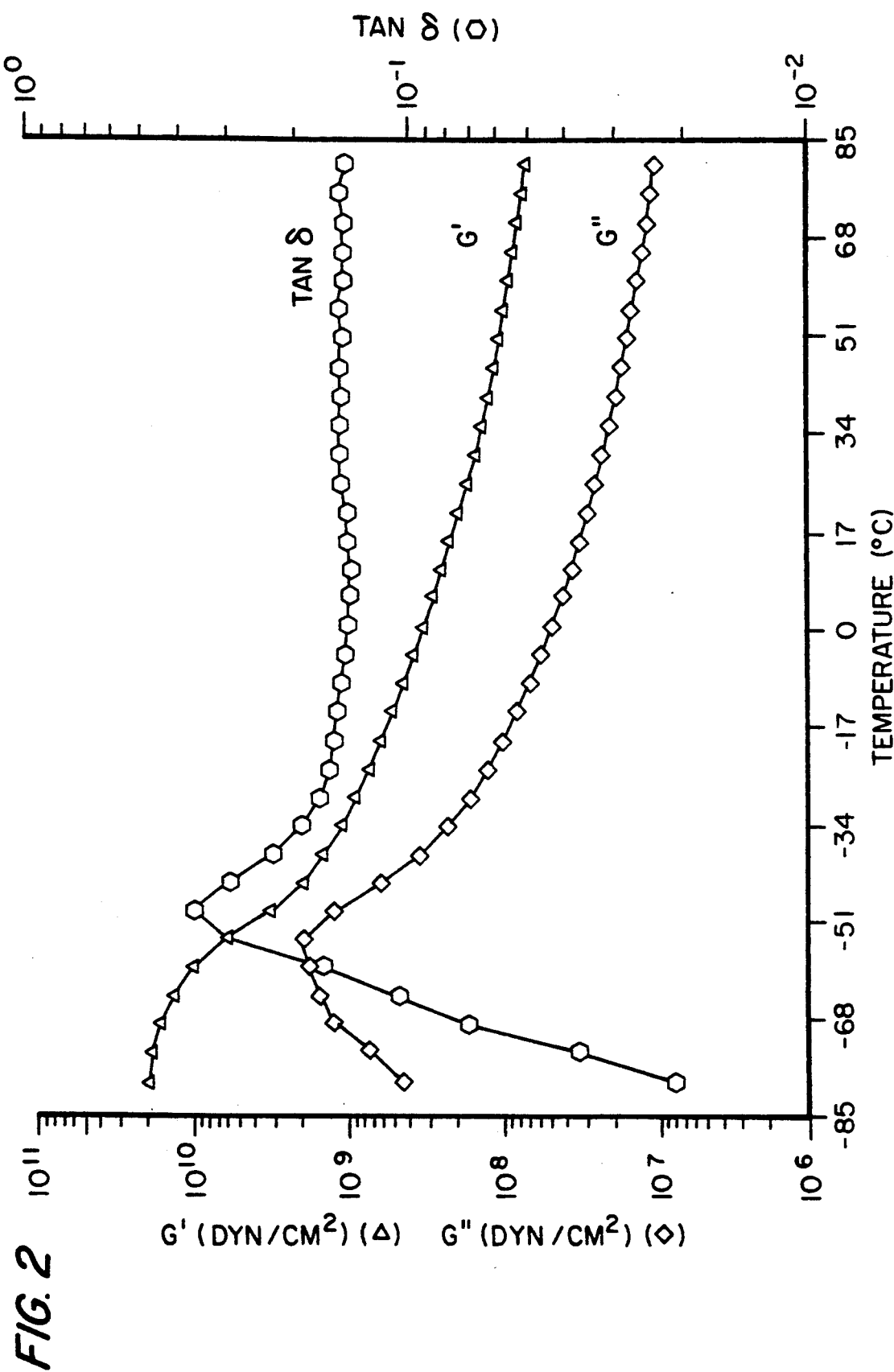
FIG. 2 shows viscoelastic curves for a tire tread employing the rubber blend of this invention.
Figure 3:
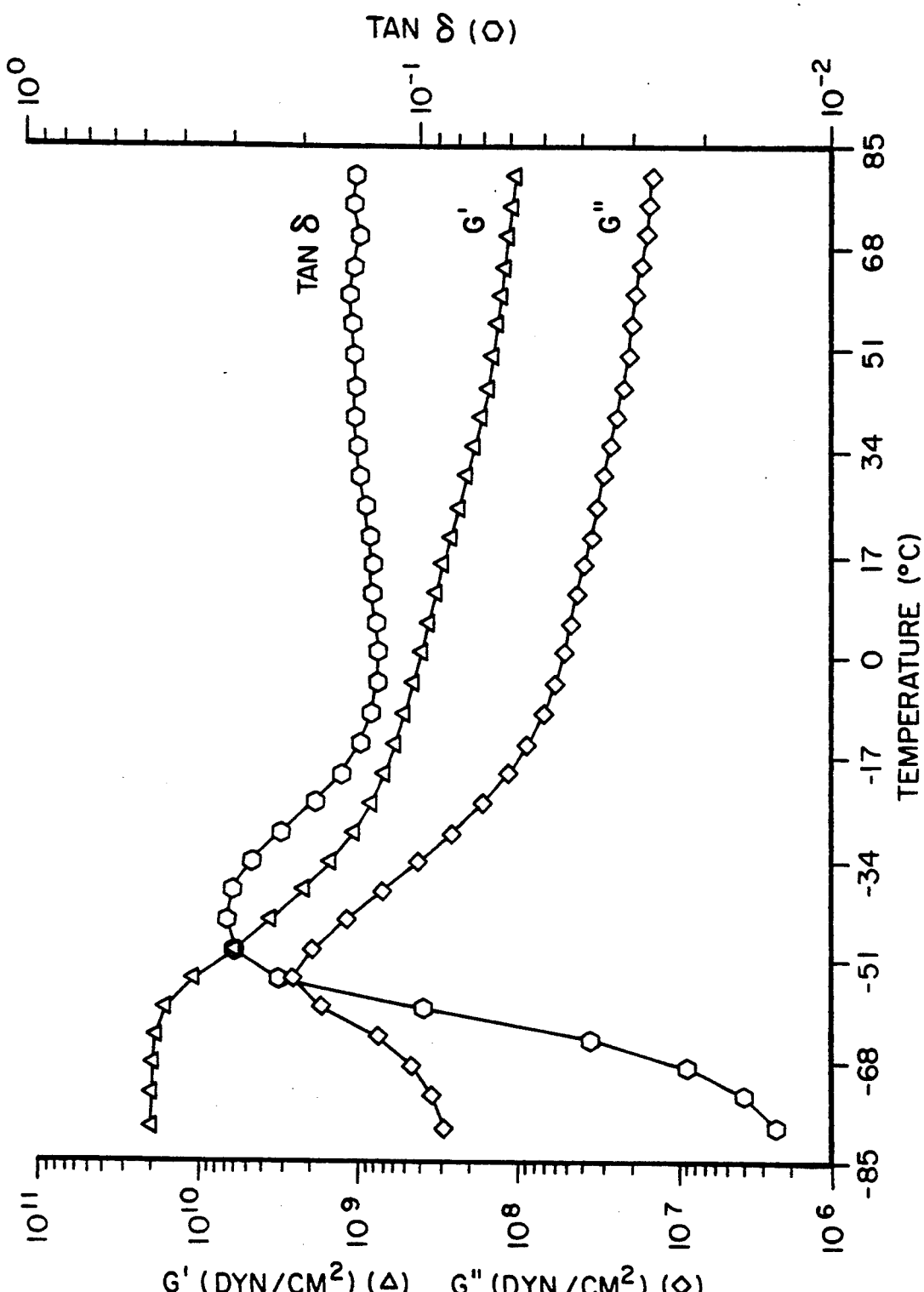
FIG. 3 shows analogous viscoelastic curves for a control tire tread. The curves plot hysteresis loss (tan $\delta$), dynamic modulus (G′) and loss modulus (G″).

This example illustrates the hysteresis response for compositions D and E of Example 3 compared by testing samples over a broad temperature spectrum ranging from −80° C. to 80° C. at 1 Hz and 0.1% strain using a Rheometric-Dynamic Analyzer RDAII. The viscoelastic curves are plotted in FIGS. 2 (composition E) and 3 (composition D). The tan δ peak at the low and intermediate temperature region for composition E indicates good traction, better than the control, while at the same time a lower than typical loss factor in the upper temperature range indicates good rolling resistance. At intermediate temperatures, the tan δ plot is higher than the control composition D, indicating superior wet traction.

EXAMPLE 5

In this example, professional drivers ranked performance of tires having treads comprising the control tread rubber composition D of Example 3 are compared with tires having treads comprising a tread rubber composition of this invention, composition E of Example 3 above. Cars equipped with four tires having the respective tread compositions were exhaustively road tested for handling and performance characteristics on various surfaces and seasonal conditions, including a high speed racetrack.

In these tests, tires having the tread rubber of this invention performed better than control tires in the following categories:

|  | Superior by |
|---|---|
| Snow Traction (Hill Climb) | 16% |
| Wet Ice Traction | 4% |
| Dry Ice Traction | 4% |
| Treadwear, 32,000 miles | 5% |
| Rolling Resistance | 5% |

Moreover, on a scale of 10, a professional drive at a high speed racetrack gave tires having the tread rubber of this invention an overall ride and handling rating of 7½, as compared to 7 for the control tires.

Additional test results are summarized in Table V below.

TABLE V

| Characteristics | | |
|---|---|---|
|  | Composition | |
|  | D | E |
| Abrasion Resistace (DIN Abrader) | | |
| Volume Loss, mm$^3$ | 146 | 95 |
| Wet Traction (Skid Trailer) | Superior by | |
| 20 mph | 6% | |
| 40 mph | equal | |
| Dry Traction (Skid Trailer) | | |
| 40 mph | equal | |

The above description is for the purpose of teaching the person of ordinary skill in the art how to practice the present invention, and it is not intended to detail all those obvious modifications and variations of it which will become apparent to the skilled worker upon reading the description. It is intended, however, that all such obvious modifications and variations be included within the scope of the present invention, which is defined by the following claims.

What is claimed is:

1. A rubber blend comprising low vinyl polybutadiene having a vinyl content of about 10 to about 30 weight percent, polyisoprene, and a diene polymer having a glass transition temperature of about −5° to about −20° C.

2. A rubber blend according to claim 1 comprising about 30 to 50 parts per hundred low vinyl polybutadiene, about 25 to 60 parts per hundred polyisoprene, and about 10 to 25 parts per hundred of a diene polymer having a glass transition temperature of about −5° to about −20° C.

3. A tire tread comprising a rubber blend according to claim 2.

4. A rubber blend according to claim 2 wherein said polyisoprene is natural rubber.

5. A rubber blend according to claim 1 wherein said diene polymer having a glass transition temperature of about −5° to about −20° C. is selected from the group consisting of high styrene styrene/butadiene having about 30 to about 50 weight percent bound styrene, methyl rubber, butadiene/acrylonitrile copolymers, styrene/ isoprene/butadiene terpolymers, and ethylene/propylene/diene.

6. A rubber blend according to claim 2 wherein said rubber blend comprises about 40 weight percent low vinyl solution said polybutadiene, about 40 weight percent natural rubber, and about 20 weight percent high styrene solution styrene/butadiene having about 30 to about 50 weight percent bound styrene.

7. A tire tread rubber composition comprising a rubber blend according to claim 6 and effective amount of processing aids, accelerators, cross-linking and curing agents, antidegradants, and fillers.

8. A tire tread comprising a rubber blend according to claim 6.

9. A tire having a tread comprising a rubber blend according to claim 6.

10. A rubber blend according to claim 2 wherein the low vinyl polybutadiene has a vinyl content of about 20 weight percent.

11. In a tire tread rubber comprising rubbers selected from the group consisting of styrene/butadiene, natural rubber, synthetic polyisoprene, and a mixture thereof, the improvement wherein said styrene/butadiene is high styrene styrene/butadiene having having a glass transition temperature of about −5° to −20 C. and about 30 to about 50 weight percent bound styrene, and wherein said tire tread rubber further comprises low vinyl polybutadiene having a vinyl content of about 10 to about 30 weight percent.

12. A tire tread a rubber according to claim 11 wherein said high styrene styrene/butadiene is high styrene solution styrene/butadiene and said low vinyl polybutadiene is low vinyl solution polybutadiene.

13. A tire tread rubber according to claim 11 comprising about 30 to 50 parts per hundred low vinyl polybutadiene, about 25 to 60 parts per hundred natural rubber, synthetic polyisoprene or a mixture thereof, and 10 to 25 parts per hundred high styrene styrene/butadiene having a glass transition temperature of about −5° to −20° C.

14. A tire tread comprising the tire tread rubber according to claim 13.

15. A tire tread rubber according to claim 13 comprising about 40 parts per hundred low vinyl solution polybutadiene, about 40 parts per hundred natural rubber and about 20 parts per hundred high styrene solution styrene/butadiene.

16. A tire having a tread comprising the tire tread rubber according to claim 15.

17. A tire tread rubber according to claim 13 wherein the low vinyl polybutadiene has a vinyl content of about 20 weight percent.

18. In a method for producing a pneumatic tire which comprises preparing a tire tread composition having a rubber component, extruding said composition over the belt area of a partially assembled green tire, and assembling the remaining components prior to curing, an improvement wherein said rubber component comprises about 30 to 50 parts per hundred low vinyl solution polybutadiene having a vinyl content of about 10 to about 30 weight percent; about 25 to 60 or a mixture thereof; and about 10 to 25 parts per hundred diene polymer rubbers having a glass transition temperature of about −5° to about −20° C. selected from the group consisting of high styrene solution styrene/butadiene rubber having about 30 to about 50 weight percent bound styrene, methyl rubber, butadiene/acrylonitrile copolymers, styrene/isoprene/butadiene terpolymers and ethylene/propylene/diene.

19. A method according to claim 18 wherein said rubber component comprises about 40 parts per hundred low vinyl solution polybutadiene, about 40 parts per hundred natural rubber, and about 20 parts per hundred high styrene solution styrene/butadiene rubber.

20. A tire made according to the method of claim 19.

* * * * *

UNITED STATES PATENT AND TRADEMARK OFFICE
CERTIFICATE OF CORRECTION

PATENT NO. : 5,219,944

DATED : June 15, 1993

INVENTOR(S) : R.M. Scriver, T.S. Mroczkowski, & S.D. Patkar

It is certified that error appears in the above-identified patent and that said Letters Patent is hereby corrected as shown below:

Column 3 line 57, "tireassembly" should read --tire assembly--.

Column 8, line 51, delete the "a", after "tread".

Column 9, line 14, add --parts per hundred natural rubber synthetic polyisoprene-- after "60".

Signed and Sealed this

Twenty-sixth Day of April, 1994

BRUCE LEHMAN

*Attest:*

*Attesting Officer*   *Commissioner of Patents and Trademarks*